United States Patent [19]

Weiler et al.

[11] Patent Number: 5,299,665
[45] Date of Patent: Apr. 5, 1994

[54] DAMPING BUSHING

[75] Inventors: Rolf Weiler, Eppstein; Uwe Bach, Niedernhausen, both of Fed. Rep. of Germany

[73] Assignee: Alfred Teves GmbH, Frankfurt am Main, Fed. Rep. of Germany

[21] Appl. No.: 938,702

[22] Filed: Sep. 1, 1992

Related U.S. Application Data

[62] Division of Ser. No. 585,150, Oct. 9, 1990, Pat. No. 5,161,651.

[30] Foreign Application Priority Data

Feb. 9, 1989 [DE] Fed. Rep. of Germany ....... 3903744
Dec. 6, 1989 [DE] Fed. Rep. of Germany ....... 3940276

[51] Int. Cl.$^5$ .................................................. F16J 3/04
[52] U.S. Cl. .......................... 188/73.44; 277/212 FB
[58] Field of Search ................. 188/73.35, 73.44; 277/205, 212 FB

[56] References Cited

U.S. PATENT DOCUMENTS

| 4,199,159 | 4/1980 | Evans | 277/212 FB |
| 4,447,066 | 5/1984 | Katagiri et al. | 277/212 FB |
| 4,469,337 | 9/1984 | Yokoi et al. | 188/73.44 |
| 4,753,326 | 6/1988 | Weiler et al. | 188/73.41 |
| 4,832,161 | 5/1989 | Weiler et al. | 188/73.44 |
| 5,183,136 | 2/1993 | Maeda et al. | 188/73.44 |

FOREIGN PATENT DOCUMENTS 2196398 4/1988 United Kingdom ............. 188/73.44

Primary Examiner—Matthew C. Graham
Attorney, Agent, or Firm—Robert P. Seitter; J. Gordon Lewis

[57] ABSTRACT

A damping bushing for a guide pin of a spot-type disc brake is disclosed, having an elastic pleated cup formed with a first end section fixed to a cylindrical body receiving the guide pin, and also formed with a second end section adapted to be assembled to a ring fixed to the guide pin. The ring has a recess which accepts a torus integral with the second end section The torus (74) is formed with an outer large radius of curvature portion and an inner smaller radius of curvature portion which creates a cam shape. The larger radius portion allows a pleat of the second end section to force the torus over a cone shaped ring end and into the ring recess. The torus then is retained by the smaller radius portion engaging a corner of the recess.

9 Claims, 3 Drawing Sheets

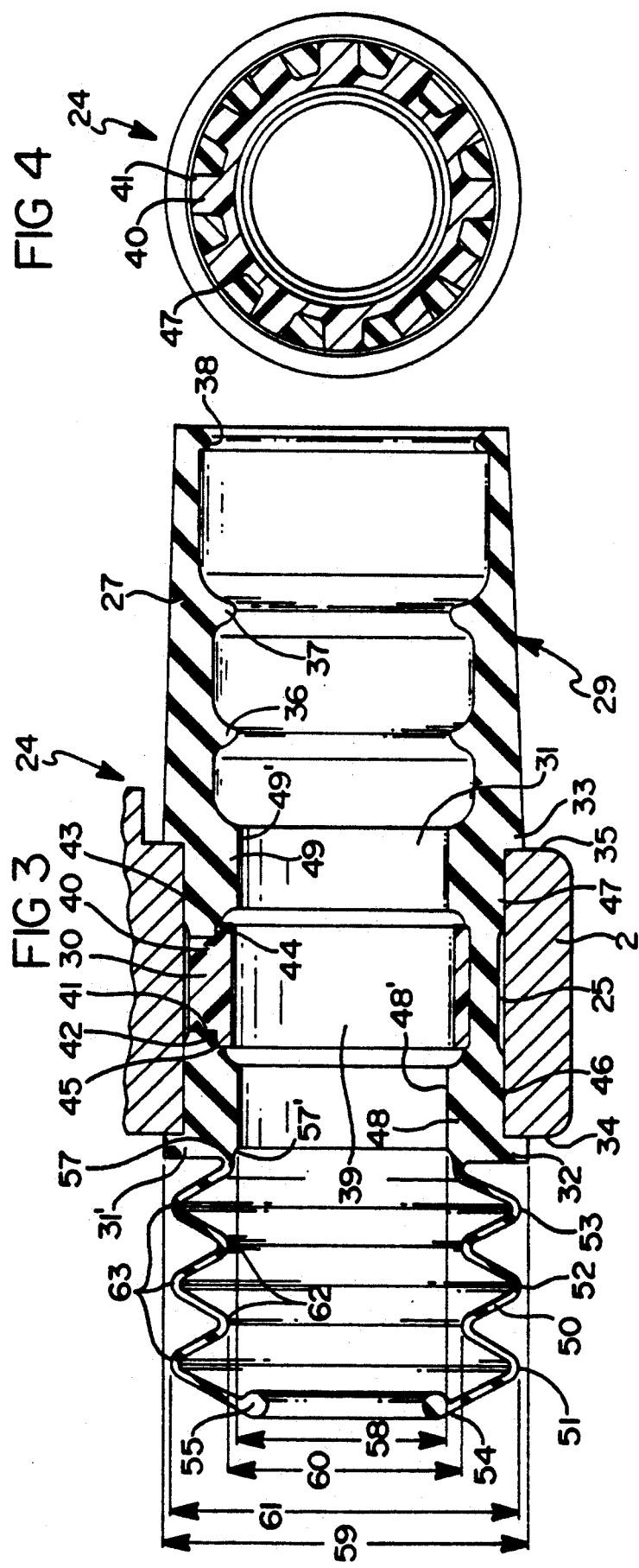

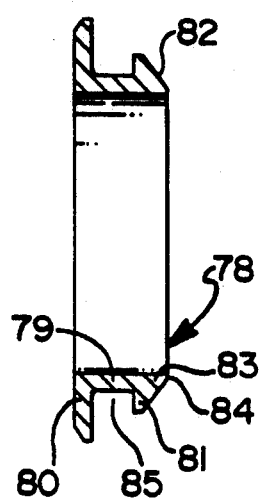
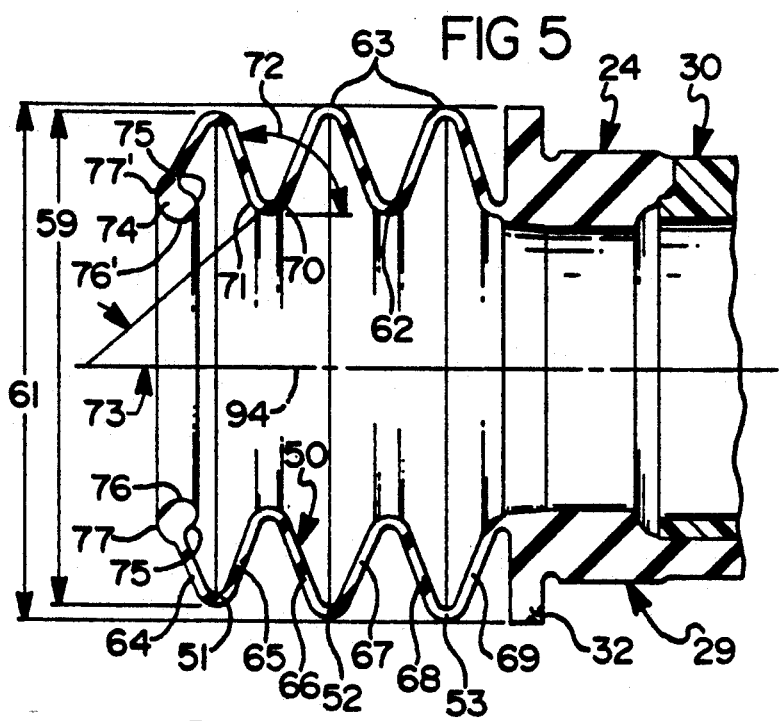
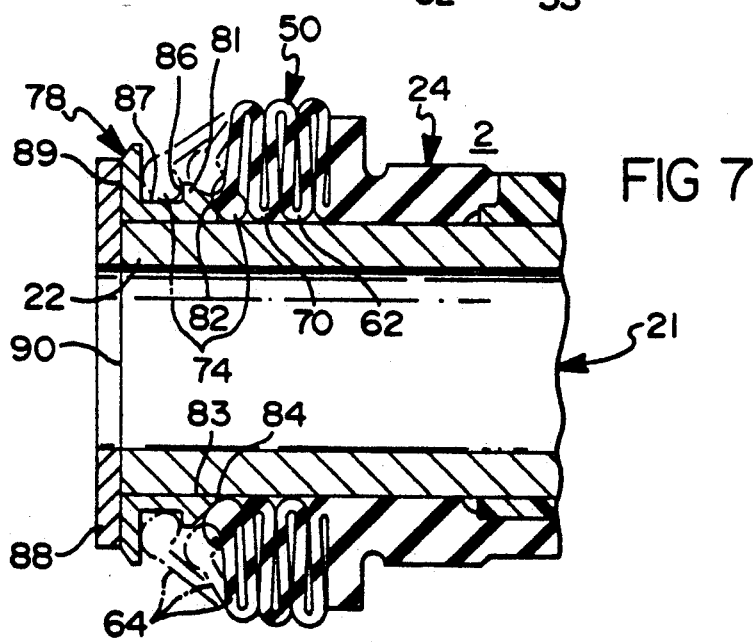
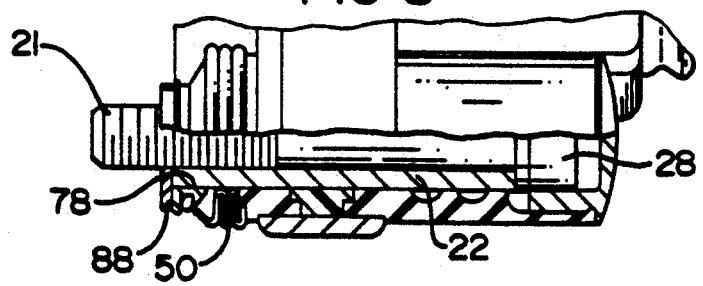

DAMPING BUSHING

CROSS REFERENCES TO RELATED APPLICATION

This is a division of U.S. patent application Ser. No. 07/585,150 filed on Oct. 9, 1990;

BACKGROUND OF THE INVENTION

The present invention relates to a damping bushing for cylindrical parts for a spot-type disc brake having.

A damping bushing is known from published German patent application No. 34 12 543. The damping bushing of this publication is composed of two parts including an elastic damping element or guide element and of a stop element coupled to the guide element in a positive locking fit. The elastic guide element presents a substantially cylindrical basic body with projections between which the stop element is arranged. The guide element is seated on a guide pin in a bore of the caliper and projects with a longer axial extension from the bore on one side. An attachment which is relatively short in axial direction is disposed on the other side of the bore. At the point of the short element attachment, dust particles may enter into the bore between the damping bushing and the guide pin.

A pin guide with a dust cover also is known from published German Patent application No. 35 14 497 whose end section is supported in a substantially U-shaped metal ring. The ring and the cup are joined or united in a manual operation.

The invention has, therefore, as an object to provide a damping bushing which is improved in its end section and whose assembly in a ring seated on a pin is simplified and facilitated. It is a further object of the invention to improve a damping bushing in such a manner that dirt is isolated from the bore and from the spaces between the damping bushing and the guide pin. The damping bushing in accordance with the present invention advantageously is of a simple design.

SUMMARY OF THE INVENTION

This object is attained according to the present invention by a damping bushing which receives the guide pin. The damping bushing is formed with a pleated cup having a body, and a first end section integral with the body, and a second end section, with an integral torus, shaped to have a large radius of curvature at a portion located away from the second end section, and a smaller radius of curvature at a portion adjacent the second end section. The pleated cup is, thus, furnished with a torus having a shape creating a cam action. This cam action is used to enable the torus to be installed in a recess of a ring fixed to the guide pin. The large radius portion of the cam shape bridges over a step in the end of the ring and the smaller radius portion becomes hooked in a corner of the ring recess.

Advantageously, the torus is expansible and dilatable so that the pleated cup with its pleats urges the larger radius portion of the torus over the end of the ring and over a ramp surface defined by a cone shaped end of the ring. When the guide pin travels back from the ring, the cam-shaped torus twists in the ring so that the portion with the smaller radius is hooked, in corner of the recess in the ring.

Advantageously, the pleated cup is arranged with a plurality of radially directed pleats, with the one nearest to the torus having a smaller radially outer diameter than the next adjacent pleats. Accordingly, the pleats of the pleated cup bulging out when compressed in axial direction prevents the axially external pleated cup from projecting beyond one end of the guide pin in axial direction thereby avoiding shearing off and damage to the pleated cup.

A simplified assembly is provided, with the bottom of the outermost pleat pressing onto the torus in an axial direction with an outer surface. The outer surface of the pleat bottom acts as a second ramp and engages underneath the torus so that the latter is moved over the end of the ring facilitated by a rocking effect.

Advantageously, a disc is placed onto the threaded side of the guide pin; that is, on that part with which the brake is fastened to the integrated steering knuckle, the disc being abutted both against the ring and against a part of the guide pin which has a larger diameter. When the ring has an H-shaped cross section with a second, radially extending web, then the cup protects against any heat emanating from the brake disc and, secondly, against damage during assembly of the brake carrier and the brake housing.

BRIEF DESCRIPTION OF THE DRAWINGS

The following provides a more detailed description of the embodiment of the present invention with reference to the accompanying drawing, in which:

FIG. 3 shows a damping bushing in a sectional lateral view;

FIG. 4 shows a cross section of the damping bushing;

FIG. 5 shows in section a pleated cup of a damping bushing with a cam-shaped end;

FIG. 6 shows in section a ring incorporated in the guide pin;

FIG. 7 shows in section an assembly procedure by which the pleated cup is being inserted into the ring; and, FIG. 8 shows in partial section the spot-type disc brake with the pleated cup.

DETAILED DESCRIPTION

Figure 1:
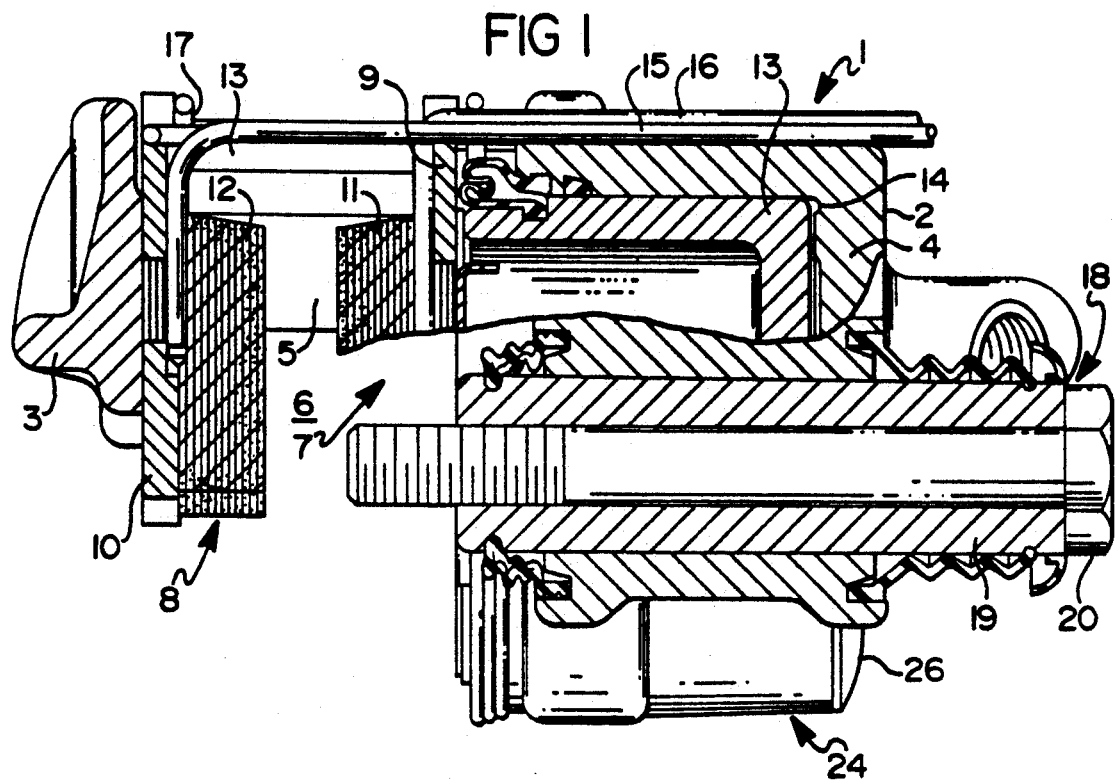
FIG. 1 shows a floating caliper spot-type disc brake in a sectional lateral view with a carrier pin.

In the FIGS, like elements bear like reference numerals.

Figure 2:
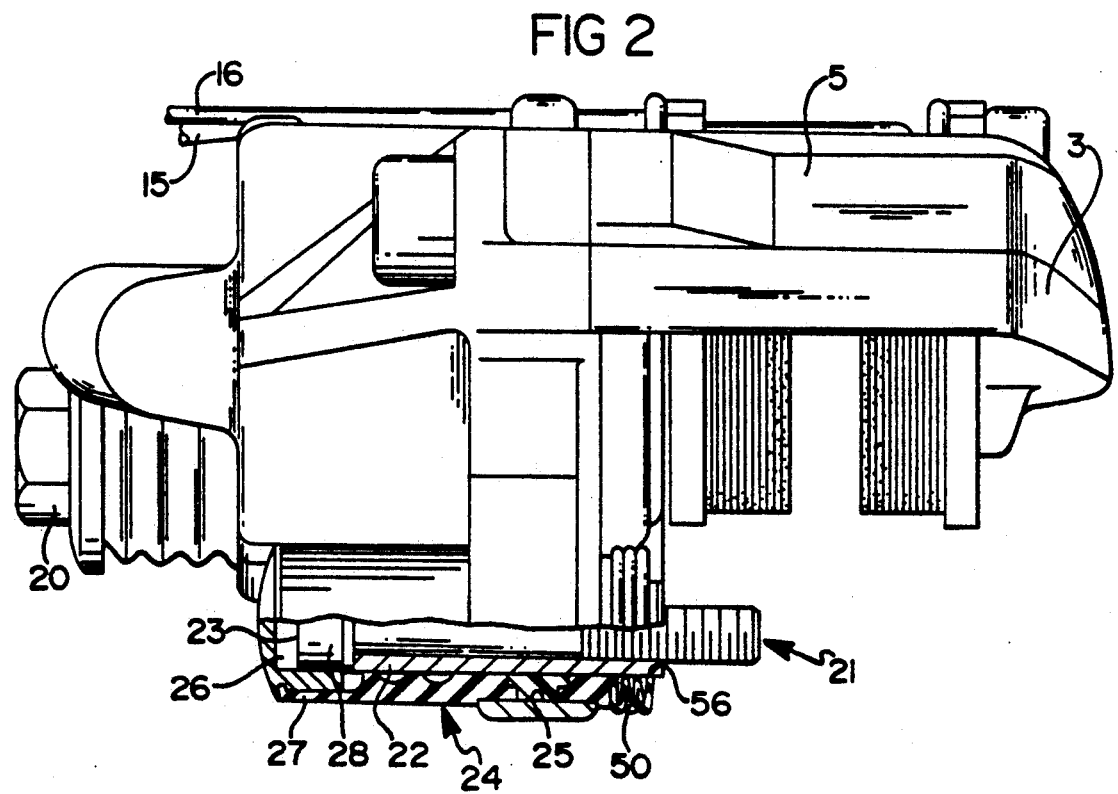
FIG. 2 shows the floating caliper spot-type disc brake in another lateral view with a guide pin.

FIGS. 1 and 2 show a spot-type disc brake 1 with a caliper housing 2 comprised of an external web 3, an internal web 4 and a bridge section 5. Brake shoes 7, 8 comprised of carrier plates 9, 10 and friction linings 11, 12 are guided in a guide 6. Brake shoes 7, 8 are movable axially on two pins 13.

In the internal web 4, an actuating unit 13, 14 comprising a piston 13 and a cylinder 14 is arranged which moves the internal brake shoe 7 directly and the external brake shoe 8 indirectly with the aid of the external web 3, against the brake disc.

Two electric conductors 15, 16 have ends extending up into the friction linings.

The shoes 7, 8 are retained in guide 6 free of rattling by a pad retaining spring 17. In the event of a movement of the brake, caliper housing 2 slides on a carrier pin 18 which comprises a carrier bushing 19 and a screw 20. Screw 20 is threaded into a steering knuckle, typically into a brake carrier, not shown in the drawing.

A guide pin 21 is positioned at a distance from the carrier pin 18 in the circumferential direction. The carrier pin 18 absorbs the circumferential force, and the guide pin 21 prevents a rotation or tilting about the carrier pin 18. Guide pin 21 is comprised of a second carrier bushing 22 and of a second pin 23 threaded at one end. A damping bushing 24 surrounds the carrier bushing 22 generally in the shape of a sleeve and is fit within a bore 25 of the caliper 2. One end of the pin 23 is threadedly advanced into the brake mounting steering knuckle or brake carrier and to hold the carrier bushing 22 holding the other end against the steering knuckle or brake carrier.

A dust hood cap 26 is positioned within axial extension 27 of the damping bushing 24 extending in one direction over the threaded pin 23 and bushing 22 and snap fit thereto to seal seals the damping bushing 24 on the end next to the drive screw head 28. A pleated cup 50 of the damping bushing 24 engages a groove 56 of the carrier bushing 22 to enclose the threaded pin 23 and bushing 22.

FIGS. 3 and 4 show that the damping bushing 24 is composed of two parts, a guide element 29 and a stop element 30 coupled to the guide element 29 in a positive locking fit. The guide element 29 comprises a substantially cylindrical basic body 31 with an axial extension 27 and attachment 31' each formed with radially extending shoulders 32, 33. The two shoulders 32, 33 each extent radially outwardly to a slight extend, for example 0.15 mm, beyond the diameter of the intermediate section. With these shoulders 32, 33, the and damping bushing 24 abuts against the surfaces 34, 35 of the caliper 2 which define the bore 25.

On the inside, the basic body 31 is formed with radially inwardly extending circumferential ridges 36, 37, 38. Ridges 36, 37 are in engagement, in the assembled condition, with the pin 21 which extends through the bore 25.

In the section between the shoulders 32 and 33 of the guide element 29, the stop element 30 is arranged. Stop element 30 also is furnished with a substantially cylindrical second basic body 39 which is provided with a number of radially outwardly extending elongated extensions 40 only one identified in the drawing.

In this context, the size and the position of the extensions 40 is selected such that in case of loading, a plurality of ribs always is active and, thus, elevated bearing forces will be absorbed without significant deformation and sufficient space will nevertheless remain between the extensions 40 to accommodate the elastic material of the guide element 29 in order to obtain a sufficient sturdiness of the damping bushing 24 as a whole.

The internal diameter of the hollow cylindrical basic body 39 of the stop element 30 is dimensioned such that it provides a slight play with respect to the guide pin arranged therein, for example a radial play of 0.3 mm in case of a pin diameter of roughly 13 mm. It is ensured in this manner that in normal cases the guide element 29 exclusively is in contact with the guide pin.

A number of recesses 41 corresponding to the number of extensions 40 are provided in the guide element 29 section lying between the shoulder 32, 33. The extensions 40 of the stop element 30 are received in the recesses 41. For this purpose, the recesses 41 have a contour complementary to the shape of the extensions 40, so that extensions 40 are snugly surrounded by the elastic material of the guide element 29. Since the cylindrical basic body 39 of the stop element 30 is slightly longer in the axial direction than the extensions 40, shoulders 42, 43 are formed in the range of transition between the basic body 39 and the extensions 40. Correspondingly to the shoulders 42, 43, further shoulders 44, 45 are provided at the ends of the recesses 41 of the guide element 29, and as a result, the shoulders 42, 43 of the stop element 30 abut against the shoulders 44, 45 of the guide element 29 in the assembled condition. The wall thickness of that section of the guide element 29 which is positioned in the gaps of the stop element 30 is substantially equal to or slightly smaller than the height of the extensions in the radial direction.

In other words, in the range of the extensions 40, the guide element 29 does not extend radially beyond the extensions 40. In this configuration, it is desirable to extend the range having an equal or somewhat smaller diameter slightly beyond the range of the projections in the axial direction.

Outer diameters 46, 47 are provided on the guide element 29 on either side adjacent to this range. These outer diameters 46, 47 have only a slightly larger diameter than the portion which is positioned between the extensions 40. For example, 0.3 mm in case of a diameter of the guide element 29 of approximately 20 mm. The caliper housing 2 thus rests on the projections 46, 47 without contact with the stop element 30. The stop element 30 is suitably made of a glass fiber-reinforced, high-strength, thermostable thermoplastic material. In this context, the radial marginal layers of the stop element 30 including the extensions 40 remain free of glass fiber. Manufacture is accomplished by molding the stop element 30 together with the guide element 29.

The guide element 29 is provided with radial inwardly extending diameters 48, 49 with cylindrical surfaces 48' 49' and with ring-shaped circumferential ridges 36, 37 which rest on the pin 21 in the shape of stops to center it and to provide damping.

The ridge 38 of the extension 27 serves to axially secure the dust hood 26.

On the side facing the brake carrier or steering knuckle, the damping element 29 is an arranged integrally with a pleated cup 50 which, with an enlarged ring 55 at its end, sealingly engages the ring-shaped circumferential groove 56 of the pin 21 provided for the purpose. Pleated cup 50 is furnished with three, radially directed pleats, 51, 52, 53. Pleat 53, which is positioned nearest to the cylindrical basic body 31, begins radially inside at the radially internal section 56 being formed with the edge 56'.

The ring 55 at the end 54 of the pleated cup 50 has a circular cross section. Each of the pleats 51 to 43 has an internal diameter and an external diameter 60 and 61, the internal diameter 60 being larger than an internal diameter 58 of the projection 48 and the external diameter 61 smaller than an external diameter 59 of the projection 32. In this manner, it is ensured that in the condition of rest, pleat bottoms 62, 70 of the pleated cup 50 will not scrape the pin and, on the other hand, pleat peaks 63 will not scrape against the caliper 2.

FIG. 5 shows the pleated cup 50 of the dust cover 24 with the pleats 51, 52, 53. Each one of pleats 51, 52, 53 has two substantially radially extending converging pleat walls 64, 65, 66, 67 and 68, 69. At a ring-shaped pleat bottom 70 between the walls 65, 66 of the pleats 51, 52 a leading surface 71 is provided extending at an angle 72 of about 70 degrees. The leading surface 71 is, thus, capable of engaging a ring-shaped circumferential torus 74 having a cam-shaped cross section part of the pleated cup 50.

In a first portion 75 which is disposed opposite the wall 65, torus 74 has a first, small radius of curvature 75' of approximately 0.2 mm, in a second portion 76 directed toward the center line 94, a second radius of curvature 76' of approximately 0.7 mm, and in a third portion 77 facing toward the outside, away from the wall 75, a radius 77' of approximately 1.1 mm. The pleat peaks 63 of the pleats 52, 53 have the same diameter 61 as the shoulder 32. The diameter 59 of the pleat peak of the outermost pleat 51 is smaller than the diameter 61.

FIG. 6 shows a metal ring 78 with a radially extending web 81 forming a first web referred to as the attachment in the text that follows, and with a bushing-shaped section 79 forming a second web, referred to as the bushing in the text that follows. With a radially extending web 80, the metal ring 78 becomes H-shaped. The web 80 extends farther outside in radial direction that the web 81. The ring 78 is formed with a ramp-shaped cone 82 which is formed on the web 81 on a side thereof facing away from the web 80. At its peak 83, the ramp 82 ends up with a radially extending surface 84 forming a step. The webs 79, 80, 81 define a U-shaped recess 85.

FIG. 7 shows an automatic assembly procedure in which the torus 74 slides over the ramp 82 and becomes engaged behind the web 81. Ring 78 is, in this configuration, rigidly coupled to the guide pin 21. The housing 2 slides over the pin 21, and in doing so entrains the damping bushing 24. The pleated cup 50 is compressed in the axial direction, and the torus 74 as well as the pleat bottoms 62, 70 are kept abutted against the pin 21 until one edge 83 of the ring 78, the torus 74 and the pleat bottoms 62, 70 strike against each other in axial direction.

Due to the shearing effect of the edge 83 and pressure of the surface 71, the torus 74 is moved radially outwardly and slides upward over the ramp 82. During this, the portion 77 having the largest diameter is in abutment with the edge 83 and overcomes the radially extending surface 84 at the edge 83 of the web 81. In the course of further compression of the ring 78 and of the damping bushing 24, the pleat bottom 70 also slides over the ramp 82 until the torus 74 is detachably engaged behind the web 81. When the housing 2 travels back, the torus 74 will twist in the recess 85 of the ring 78, and with the portion having a smaller diameter, it engages or hooks on the axially extending surface 86 and with a peripheral surface 87 of the bushing 79.

In this connection, the movement performed by the pleat wall 64 and by the torus 74 is illustrated in dash-dotted lines. An independent assembly of the damping bushing 24 is achieved by the special shape of the torus 74 presenting a larger external radius of curvature and a smaller internal radius of curvature as well as a sharp corner positioned at the pleat juxtaposed to the torus 74 which brings about a rocking effect, and to a ramp 82 at the ring 78 provided as a guard plate.

FIG. 8 shows the spot-type disc brake 1 with the cup 50 is engaged with its torus 74 in the recess 85 of the ring 78. With the disc 88 which is in abutment both against the bushing 22 and against the ring 78, the ring 78 is urged onto the bushing 22 until front surfaces 89, 90 are positioned flush with each other in the axial direction.

We claim:

1. A pin guide and damping bushing for the caliper of a floating caliper spot-type disc brake provided with a brake carrier and with a caliper being axially slidable in respect to the brake carrier and straddling a brake disc and brake shoes, said brake carrier and caliper having at least one pin, guided within a bore in a portion of said caliper, said pin having a threaded end adapted to be threadably received in a brake mounting structure and a drive head on the other end, a bushing sleeve received over said pin with said drive head positioned against one end of said bushing to be adapted to force the other end of said bushing to abut against said brake mounting structure when said pin threaded one end is advanced into said brake mounting structure, at least one elongated hollow tubular elastic damping guide element having a portion positioned in said bore in said portion of said caliper and received over said bushing, a rigid stop element carried by said damping guide element and also receiving said bushing limiting radial movements of said pin and bushing within said bore, said stop element having a basic body portion which has a tubular-shaped cross section, and also having radially outwardly directed extensions which form stop surfaces, one section of said damping and guide element having interstices receiving said stop element extensions; said damping guide element having on one end an axial extension extending from said portion of said damping guide element within said bore in said caliper portion and surrounding said pin and bushing, said damping guide element also having formed on the other end an integral pleated cup surrounding said pin and bushing, said axial extension having an end located axially past said drive head of said pin; a dust cover cap fit to said end of said axial extension to completely enclose said drive head; and, said pleated cup engaged with said bushing adjacent said other end, abutting said brake mounting structure whereby said damping guide element encloses said pin and bushing.

2. A pin guide and damping bushing as claimed in claim 1, wherein a free end of said pleated cup sealingly engages a ring-shaped circumferential recess in said bushing adjacent said other end thereof.

3. A pin guide and damping bushing as claimed in claim 2, wherein said pleated cup ends at a radially internal edge of said damping guide element facing said pin and bushing.

4. A pin guide and damping bushing as claimed in claim 3, wherein said damping guide element is formed with a groove recessed into the outside portion thereof received in said bore of said caliper portion and radial surfaces defining said groove are abutted against opposite surfaces of said caliper portion defining said bore.

5. A pin guide and damping bushing as claimed in claim 4, wherein the wall thickness of said section of said damping guide element having said interstices is substantially equal to or smaller than the radial dimension of said extensions, and wherein said stop element has an internal diameter larger than an internal diameter of said section of said damping guide element juxtaposed to said stop element.

6. A pin guide and damping bushing as claimed in claim 5, wherein the axial length of said basic body of said stop element is longer than the axial length of said extensions.

7. A pin guide and damping bushing as claimed in claim 1 wherein said dust cover cap is formed with an annular recess and said axial extension is formed with a ridge snap fitted into said recess of said duct cover.

8. A pin guide and damping bushing as claimed in claim 7 wherein said dust cover includes an axially extending portion slidably received in said axial extension.

9. The pin guide and dust cover as claimed in claim 1 wherein said axial extension is formed with a plurality of internal ridges engaging said pin bushing to provide damping contact therewith.

* * * * *